Feb. 21, 1956  A. E. DODD  2,735,966
BATTERY CHECKING CIRCUIT ARRANGEMENT
Filed May 21, 1952

INVENTOR.
Arthur E. Dodd.
BY  W. L. Stout

HIS  ATTORNEY

United States Patent Office 2,735,966
Patented Feb. 21, 1956

2,735,966

BATTERY CHECKING CIRCUIT ARRANGEMENT

Arthur E. Dodd, Edgewood, Pa., assignor to Westinghouse Air Brake Company, Wilmerding, Pa., a corporation of Pennsylvania Application May 21, 1952, Serial No. 289,112

6 Claims. (Cl. 317—141)

My invention relates to a time delay circuit arrangement including a capacitor snubbed time delay relay which is supplied with energy from a battery charged by a charging means having poor voltage regulation, and in particular to a means for checking the operation of the operating battery in such a circuit arrangement.

In utilizing time delay relays, it is often undesirable for various reasons to have the time delay lengthened. When a capacitor snubbed time delay relay is used, one way in which this time delay could be prolonged is by charging the snubbing capacitor to a greater voltage than normal. This might occur if the battery supplying energy to the capacitor became disconnected from its charging rectifier and caused the output voltage of the rectifier to rise and be applied directly across the capacitor.

One application where capacitor snubbed time delay relays are often used is in the control of highway crossing signals at a highway grade crossing. In such an application, the capacitor snubbed time delay relay is frequently energized from a storage battery which is charged by a full-wave rectifier energized from an alternating current source through a suitable step down transformer. The alternating current supply to the rectifier sometimes has poor voltage regulation and when this is the case the rectifier output voltage rises if the battery becomes disconnected from the rectifier. This rise in output voltage of the rectifier, in addition to a further rise in voltage due to the filtering action of the snubbing capacitor, causes an appreciable increase in the voltage across the snubbing capacitor and is likely to cause an increase in the time delay of the associated time delay relay.

In such an application, the control of the highway crossing signal is effected through the medium of a track circuit including the usual track relay. When a train approaching the crossing shunts this track relay, it interrupts the energizing circuit for the capacitor snubbed time delay relay between the operating battery and the relay. The time delay is so set that under normal conditions the time delay relay will actuate the highway crossing signal in a minimum safe time after the train shunts the track circuit if the train is moving at a maximum authorized speed. If the snubbing capacitor is over-charged due, for example, to a battery disconnection, the time delay will be lengthened and the warning time may be less than the safe minimum. Such a condition is undesirable and should be avoided.

An object of my invention is to provide a circuit arrangement for preventing an increase in the time delay of a capacitor snubbed time delay relay which is normally energized by a battery charged by a rectifier in the event the battery becomes disconnected from the rectifier for any reason.

Another object of my invention is to provide a safer circuit arrangement for the control of highway grade crossing signals the control of which includes a capacitor snubbed time delay relay.

A further object of my invention is to provide a suitable means for preventing a decrease in the warning time of a highway crossing signal whose warning time is controlled by a capacitor snubbed time delay relay normally energized by a battery charged by a rectifier in the manner outlined above.

Still another object of my invention is to provide a novel circuit arrangement for actuating a highway crossing signal immediately upon a train entering the track section controlling the signal if the operating battery becomes defective or is disconnected for any reason.

According to my invention, an auxiliary relay which is energized from an operating battery over a front contact of a time delay relay directly controls some device such as a highway crossing signal. The time delay relay is of the capacitor snubbed variety and is also energized from the operating battery through a first contact. The operating battery is charged by a charging rectifier which is energized by an alternating current source over a second contact which operates in synchronism with the first contact. With this arrangement, with the operating battery functioning properly, when the first and second contacts open, the auxiliary relay remains picked up due to its energization by the operating battery until the time delay relay releases and opens the energizing circuit for the auxiliary relay, thus causing it to release and close the energizing circuit to the controlled device. However, with the operating battery not functioning properly, when the first and second contacts are opened, the auxiliary relay immediately releases since it is receiving no energy from the charging rectifier which is now deenergized. This immediately closes the circuit which energizes the controlled device causing it to immediately operate.

Other objects of my invention will appear hereinafter as the characteristic features and mode of operation of my invention are described in detail.

I shall describe two forms of battery checking circuit arrangement embodying my invention and shall then point out the novel features thereof in claims.

In the accompanying drawings.

Similar reference characters refer to similar parts in both views.

Figure 1:
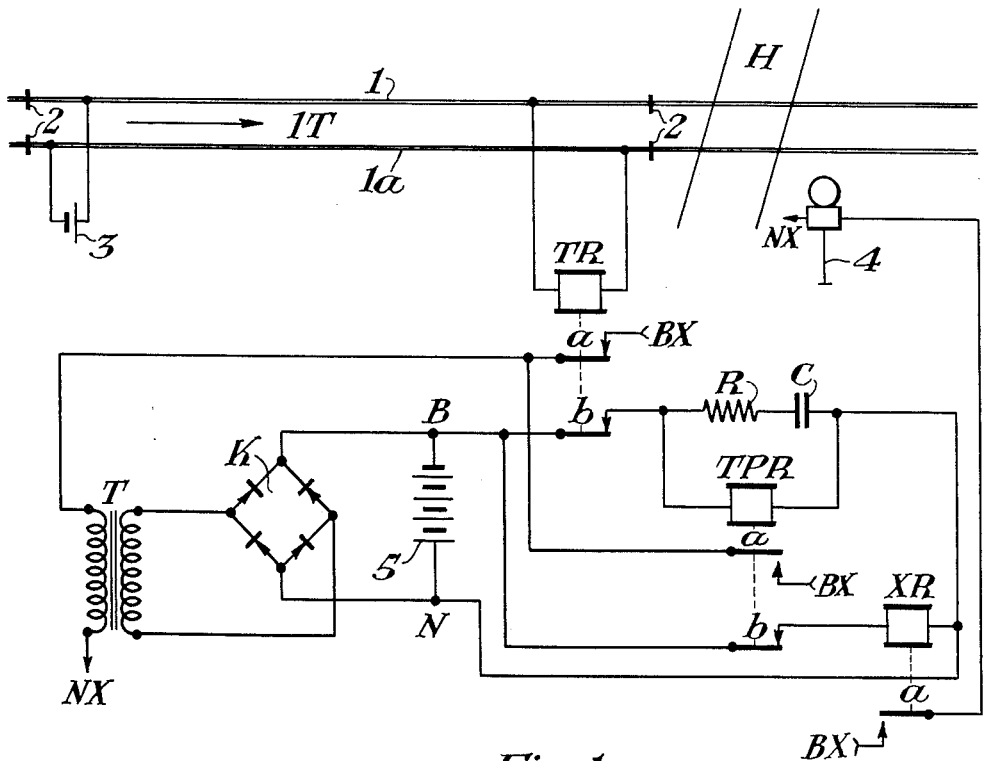
Fig. 1 is a diagrammatic view showing a preferred arrangement of a battery checking circuit embodying my invention employed in connection with a railway crossing signal installation to prevent a decrease in the signal warning time caused by battery failure.

Referring now to Fig. 1, the reference characters 1 and 1a designate the track rails of a stretch of railway track which is intersected by a highway H. These rails are divided by the usual insulated joints 2 to form a track section 1T over which traffic normally moves in the direction indicated by the arrow, that is, from left to right. Track section 1T is provided with a conventional track circuit comprising a track relay TR connected across the rails 1 and 1a at the end adjacent the highway H, and a battery 3 connected across the rails at the opposite end of the section.

Located adjacent highway H at the intersection of the highway and the track is a highway crossing signal 4 which may be of any suitable type but which, as here shown, is a bell. Highway crossing signal 4 is controlled by a circuit comprising a suitable source of alternating current having terminals BX and NX, and a back contact $a$ of a highway crossing signal control relay XR. Relay XR is in turn controlled by a front contact $b$ of a time delay relay TPR and is normally energized by an operating battery 5.

In series across the winding of time delay relay TPR is a resistor R and a snubbing capacitor C which control the release time of the time delay relay. Time delay relay TPR is controlled by a front contact $b$ of track relay TR, and is normally energized from an operating battery 5 over an obvious circuit. Operating battery 5 is charged by a rectifier K, the input terminals of which are connected to the secondary winding of a transformer T. The primary winding of transformer T is supplied with alternating current from the terminals BX and NX over an energizing circuit which includes a front contact $a$ of track relay TR and a back contact $a$ of relay TPR connected in multiple.

In normal operation, when a train enters the track section 1T in the direction designated, the wheels and axles of the train will shunt track relay TR causing it to release. The release of track relay TR will cause it to open its front contact $a$, thus interrupting the supply of energy from the alternating current source BX—NX to rectifier K. Hence, operating battery 5 will no longer receive charging energy from the rectifier. The release of track relay TR will also cause its front contact $b$ to open thus disconnecting time delay relay TPR from operating battery 5 which, in turn, will result in capacitor C commencing to discharge through the winding of the time delay relay TPR. However, as long as capacitor C remains sufficiently charged, time delay relay TPR will remain picked up and highway crossing signal control relay XR will remain picked up due to its energization by operating battery 5 over front contact $b$ of time delay relay TPR. Thus back contact $a$ of highway crossing signal control relay XR will remain open and highway crossing signal 4 will remain deenergized.

When capacitor C becomes sufficiently discharged, time delay relay TPR will release causing its front contact $b$ to open thus opening the circuit from operating battery 5 to highway crossing signal control relay XR. This causes relay XR to release and close its back contact $a$, thus energizing highway crossing signal 4 from alternating current source BX—NX and thereby warning traffic on highway H of the approaching train. Furthermore, when time delay relay TPR releases, back contact $a$ of time delay relay TPR closes thus reenergizing transformer T and recommencing the charging of operating battery 5 by rectifier K. When the train vacates the track section 1T, track relay TR picks up and closes its front contact $a$ thus reestablishing the energizing circuit to rectifier K over front contact $a$ of relay TR from alternating current source BX—NX. Front contact $b$ of track relay TR also closes, thus reenergizing time delay relay TPR and causing it to pick up. This will cause the circuit from the terminals of operating battery 5 to relay XR over front contact $b$ of relay TPR to close since front contact $b$ of relay TPR is now closed. Hence, relay XR will pick up thus causing the previously traced energizing circuit for highway crossing signal 4 to become open at back contact $a$ of relay XR. Thus the circuit arrangement will resume its normal condition as shown in Fig. 1.

If operating battery 5 is not supplying energy to the circuit arrangement due, for instance, to a broken cell or a disconnected lead, the direct current voltage across capacitor C will rise due to the poor voltage regulation of the charging means and the filtering action of the capacitor. This would cause the charge on capacitor C to be increased thus lengthening its discharge time and the release time of time delay relay TPR. If the circuit followed the same sequence of events as that already described, this would lead to a shortened and therefore unsafe warning time at the highway crossing. However, with a circuit arrangement made in accordance with my invention, such a condition cannot occur for reasons which will be made clear by the following discussion.

As the train enters track section 1T in the direction designated, track relay TR releases thus opening front contact $a$ of relay TR and opening the circuit from alternating current source BX—NX to rectifier K. At that time, because operating battery 5 is not supplying energy, no energizing current is being supplied to relay XR and it too will release. The release of this relay will result in the immediate energization of the highway crossing signal 4. Front contact $b$ of track relay TR also opens when track relay TR releases, thus causing capacitor C to commence discharging, since no energy is being supplied to keep capacitor C fully charged. The time of capacitor C's discharge may now be prolonged due to the higher voltage to which it may have become charged because of the fact that battery 5 is not effective to stabilize the output voltage of rectifier K, but any resulting increase in the release time of relay TPR cannot cause a dangerous condition at the highway since the signal 4 is already energized. When time delay relay TPR finally does release, alternating current is once more supplied to rectifier K from alternating current source BX—NX through back contact $a$ of time delay relay TPR, but front contact $b$ of relay TPR is now open so that no energy is supplied to highway crossing signal control relay XR and it will therefore remain released and energy will be continuously supplied to signal 4. As the train vacates the track section 1T, the circuit arrangement will resume its initial condition in the manner previously described. Therefore, with operating battery 5 not supplying energy to the circuit arrangement, from the time the train enters track section 1T until the time the train leaves that section, highway crossing signal 4 is energized and a safe warning period is provided.

It follows from this discussion that if the operating battery 5 were to cease energizing the circuit arrangement at any time after the train enters track section 1T and before time delay relay TPR releases, highway crossing signal control relay XR would immediately release. Of course, in such a situation, time delay relay TPR would release in its normal time because snubbing capacitor C has only been charged to its normal voltage. This affords the traffic on highway H a warning time which is somewhat longer than normal but such a warning is on the safe side. There would be no effect on the operation of the circuit if the operating battery ceased energizing the circuit arrangement after time delay relay TPR released.

No unsafe condition can arise from rectifier K becoming disconnected from the circuit arrangement since the maximum voltage which could then be impressed across snubbing capacitor C is the voltage of operating battery 5 when fully charged, which will cause a normal time delay before the release of time delay relay TPR. As operating battery 5 discharges, the time delay will decrease thus giving highway traffic more warning time than is necessary for safety.

Figure 2:
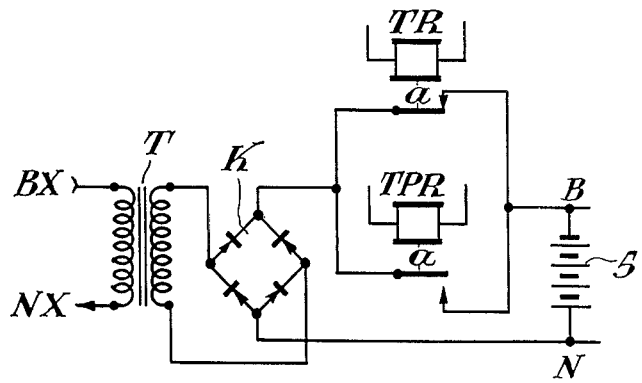
Fig. 2 is a diagrammatic view of a variation of Fig. 1.

It should be pointed out that my battery checking circuit arrangement will operate just as efficiently if the front contact $a$ of track relay TR and the back contact $a$ of time delay relay TPR were interposed in multiple in the circuit including the direct current output terminals of rectifier K and the terminals of operating battery 5, as shown in Fig. 2, instead of in the alternating current input circuit to rectifier K.

Although I have herein shown and described only two battery checking circuit arrangements embodying my invention, it is to be understood that various changes and modifications may be made therein within the scope of the appended claims without departing from the spirit and scope of my invention.

Having thus described my invention, what I claim is:

1. In combination with a battery normally supplied with charging current from a suitable source of energy, a relay provided with a capacitor across its winding for controlling its release time, a first and second contacts, means for opening and closing said first and second contacts in synchronism, circuit means including said first contact for controlling the supply of energy from said battery and the charging source to said relay, circuit means for governing the supply of charging current to the battery including in multiple a back contact of said relay and said second contact, and circuit means including a contact of said relay and normally supplied with energy from the battery and the charging source.

2. In combination with a battery normally supplied with charging current from a rectifier, a relay provided with a capacitor across its winding for controlling its release time, a first and second contacts, means for opening and closing said first and second contacts in synchronism, circuit means including said first contact for controlling the supply of energy from the battery and rectifier to said relay, circuit means for governing the supply of energy from the rectifier to the battery including in multiple a back contact of said relay and said second contact, and circuit means including a contact of said relay and normally supplied with energy from the battery and rectifier.

3. In combination with a battery, a relay provided with a capacitor across its winding for controlling its release time, a rectifier normally charging the battery, a first and second contacts, means for opening and closing said first and second contacts in synchronism, circuit means including said first contact for controlling the supply of energy from the battery and said rectifier to said relay, circuit means for governing the supply of energy from said rectifier to the battery including in multiple a back contact of said relay and said second contact, and circuit means including a contact of said relay and normally supplied with energy from the battery and said rectifier.

4. In combination with a battery, a first relay provided with a capacitor across its winding for controlling its release time, a rectifier normally charging the battery, a first and second contacts, means for opening and closing said first and second contacts in synchronism, a circuit including said first contact for governing the supply of energy from the battery and said rectifier to said first relay, a circuit governing the supply of energy from said rectifier to the battery including in multiple a back contact of said first relay and said second contact, a second relay, a circuit for energizing said second relay including a contact of said first relay and normally supplied with energy from the battery and said rectifier, and a circuit governed by said second relay.

5. In combination with a railway track circuit including a track relay, the combination comprising a battery, a rectifier normally charging said battery, a first relay provided with a capacitor across its winding for controlling its release time, a circuit including a front contact of the track relay for controlling the supply of energy from said battery and said rectifier to said first relay, a circuit governing the supply of energy from said rectifier to said battery including in multiple another front contact of the track relay and a back contact of said first relay, a second relay, a circuit including a winding of said second relay and a front contact of said first relay and normally supplied with energy from said battery and said rectifier, and a circuit governed by a back contact of said second relay.

6. In combination with a storage means normally supplied with charging current from a suitable source of energy, a relay provided with a capacitor across its winding for controlling its release time, a first and a second contact, means for opening and closing said first and second contacts in synchronism, circuit means including said first contact for controlling the supply of energy from said storage means and from the charging source to said relay, circuit means for governing the supply of charging current to the storage means including in multiple a back contact of said relay and said second contact, and circuit means including a contact of said relay and normally supplied with energy from the storage means and the charging source.

References Cited in the file of this patent

UNITED STATES PATENTS

| | | |
|---|---|---|
| 1,792,602 | Peter | Feb. 17, 1931 |
| 2,290,446 | Pflasterer | July 21, 1942 |
| 2,298,575 | Mackey | Oct. 13, 1942 |
| 2,499,202 | Thompson | Feb. 28, 1950 |